(12) United States Patent
Herbert et al.

(10) Patent No.: US 7,149,901 B2
(45) Date of Patent: *Dec. 12, 2006

(54) CRYPTOGRAPHICALLY PROTECTED PAGING SYSTEM

(75) Inventors: Howard C. Herbert, Phoenix, AZ (US); Derek L. Davis, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/768,902

(22) Filed: Jan. 29, 2004

(65) Prior Publication Data

US 2004/0186994 A1 Sep. 23, 2004

Related U.S. Application Data

(63) Continuation of application No. 09/071,374, filed on Apr. 30, 1998, now Pat. No. 6,708,274, which is a continuation of application No. 08/764,154, filed on Dec. 12, 1996, now Pat. No. 5,757,919.

(51) Int. Cl.
*H04L 9/00* (2006.01)

(52) U.S. Cl. .............. 713/190; 713/177; 713/189; 713/193; 713/194; 726/16; 711/163; 711/164; 711/167

(58) Field of Classification Search ............ 713/177, 713/189, 190, 193, 194, 201, 200; 380/25, 380/30; 711/163, 164, 167; 726/16
See application file for complete search history.

(56) References Cited

U.S. PATENT DOCUMENTS

| | | | | |
|---|---|---|---|---|
| 4,847,902 A | * | 7/1989 | Hampson | 713/190 |
| 5,007,083 A | | 4/1991 | Constant | 380/23 X |
| 5,224,166 A | * | 6/1993 | Hartman, Jr. | 713/190 |
| 5,343,527 A | * | 8/1994 | Moore | 380/4 |
| 5,386,469 A | * | 1/1995 | Yearsley et al. | 380/2 |
| 5,412,717 A | * | 5/1995 | Fisher | 380/4 |
| 5,694,569 A | * | 12/1997 | Fischer | 711/216 |
| 5,757,919 A | * | 5/1998 | Herbert et al. | 713/187 |
| 5,768,382 A | * | 6/1998 | Schneier et al. | 380/251 |
| 5,825,878 A | * | 10/1998 | Takahashi et al. | 713/190 |
| 5,944,821 A | * | 8/1999 | Angelo | 713/200 |
| 6,708,274 B1 | * | 3/2004 | Herbert et al. | 713/190 |

OTHER PUBLICATIONS

Smith, R. Internet Cryptography. pp. 1-6. Jul. 1997.*
Business Wire, New York, Vormetric Extends Its CoreGuard.*
E. Palmer, "*An Introduction to Citadel—A Secure Crypto Coprocessor for Workstations*," IBM Thomas J. Watson Research Center, Version 1.00, Sep. 30, 1992.

(Continued)

*Primary Examiner*—Taghi T. Arani
(74) *Attorney, Agent, or Firm*—Blakely, Sokoloff, Taylor & Zafman LLP

(57) ABSTRACT

A method and system for maintaining integrity and confidentiality of pages paged to an external storage unit from a physically secure environment. An outgoing page is selected to be exported from a physically secure environment to an insecure environment. An integrity check value is generated and stored for the outgoing page. In one embodiment, this takes the form of taking a one-way hash of the page using a well-known one-way hash function. The outgoing page is then encrypted using a cryptographically strong encryption algorithm. Among the algorithms that might be used in one embodiment of the invention are IDEA and DES. The encrypted outgoing page is then exported to the external storage. By virtue of the encryption and integrity check, the security of the data on the outgoing page is maintained in the insecure environment.

14 Claims, 7 Drawing Sheets

OTHER PUBLICATIONS

B. Yee, "*Using Secure Coprocessors*," School of Computer Science, Carnegie Mellon University, May 1994.

"*VMS320—High Speed PCMCIA Security Token Cryptographic Engine*," VLSI Technology, Inc., 1997.

\* cited by examiner

PRESENT PAGE DIRECTORY/TABLE ENTRY

NOT PRESENT PAGE DIRECTORY/TABLE ENTRY

| P | PRESENT PAGE | 0-NOT PRESENT | 1-PRESENT |
| --- | --- | --- | --- |
| R/W | READ/WRITE | 0-READ ONLY | 1-READ/WRITE |
| U/S | USER/SUPERVISOR | 0-SUPERVISOR | 1-USER |
| 0 | RESERVED | | |
| A | ACCESSED PAGE | 0-NOT ACCESSED | 1-ACCESSED |
| D | DIRTY PAGE | 0-NOT DIRTY | 1-DIRTY |
| L | LOCKED PAGE | 0-NOT LOCKED | 1-LOCKED |

CRYPTOGRAPHICALLY PROTECTED PAGING SYSTEM

RELATED APPLICATIONS

This application is a continuation application of U.S. application No. 09/071,374 filed on Apr. 30, 1998 now U.S. Pat. No. 6,708,274 which is a continuation application of U.S. application Ser. No. 08/764,154 filed on Dec. 12, 1996, which issued as U.S. Pat. No. 5,757,919 on May 26, 1998.

BACKGROUND OF THE INVENTION (1) Field of the Invention

The invention relates to data protection in an insecure environment. More specifically, the invention relates to handling memory resource exhaustion within a secure environment without jeopardizing the security of the data and programs used therein.

(2) Related Art

Resource exhaustion and particularly memory exhaustion is a common problem in computer systems. The random access memory (RAM) from which programs can be executed is necessarily limited both by cost and space. External memory devices such as hard disk drives, magnetic tape, and so forth are used to hold programs and data not currently being accessed by the processor. Virtual memory uses these external memory devices to ameliorate the physical memory constraints of the RAM and create the appearance that adequate space is available in the RAM to hold all the currently needed code and data. Virtual memory has a hierarchical structure based on a page directory, page tables, and page frames. A page frame contains a block of usable code or data. The size of the block is determined by design considerations. One common page frame size in existing systems is four kilobytes. Thus, the minimum size blocks that can be moved in from external memory to RAM in such a system is a 4K block. The page table holds the base addresses of a number of page frames. A page table is the same size as a page frame and can similarly be paged out to external memory.

The page directory is similar to the page table except that it holds the base address of a number of page tables. Typically, it is retained in internal memory and not paged out. The base address of the page directory is held in an internal CPU control register. Functioning of paging systems is generally well understood in the art.

It is also possible to create a physically secure environment. For example, one draconian method of creating a physically secure environment might be placing the CPU and its RAM in a safe with wires running out of the safe to an external storage unit. While this creates a secure environment within the safe, data paged out to the external memory is readily compromised. Moreover, the resource exhaustion issues are exacerbated in the secure environment model because both cost and space concerns escalate to maintain a physically secure environment, e.g. need a bigger safe.

In view of the foregoing, it would be desirable to be able to insure reasonable security from substitution and modification attacks of programs and data beyond the memory capacity of a secure environment.

BRIEF SUMMARY OF THE INVENTION

A method and system for maintaining integrity and confidentiality of pages paged to an external storage unit from a physically secure environment is disclosed. An outgoing page is selected to be exported from a physically secure environment to an insecure environment. An integrity check value is generated and stored for the outgoing page. In one embodiment, this takes the form of taking a one-way hash of the page using a well-known one-way hash function. The outgoing page is then encrypted using a cryptographically strong encryption algorithm. Among the algorithms that might be used in one embodiment of the invention are IDEA and DES. The encrypted outgoing page is then exported to the external storage. By virtue of the encryption and integrity check, the security of the data on the outgoing page is maintained in the insecure environment.

DETAILED DESCRIPTION OF THE INVENTION

Figure 1:
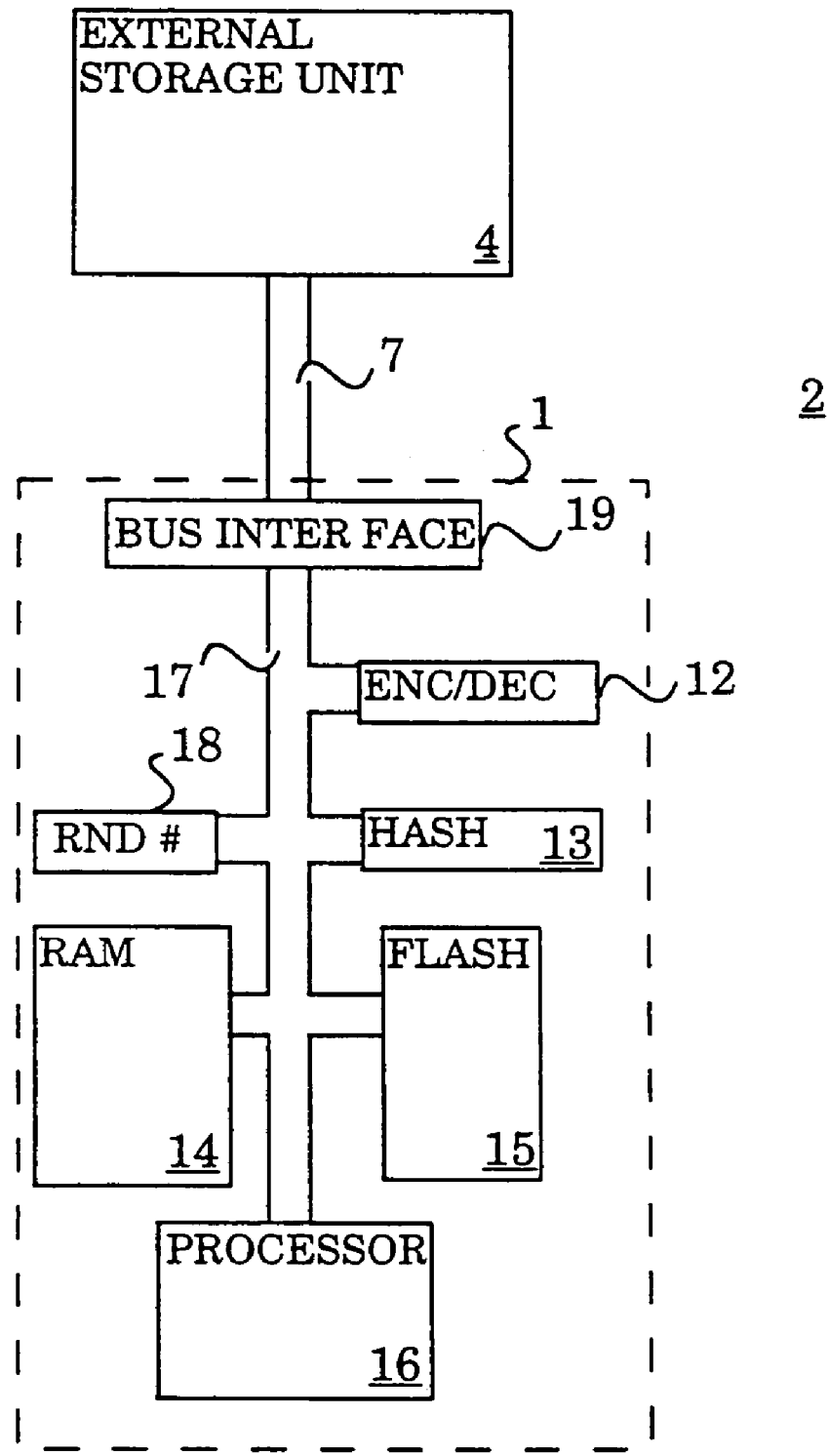
FIG. 1 is a block diagram of a system of one embodiment of the invention.

FIG. 1 shows one embodiment of the invention in which a physically secure environment 1 is coupled to an insecure environment 2, and particularly, an external storage unit 4 by a bus 7. Various ways of creating this physical barrier are generally well-known in the art, among them, tamper-resistant packaging materials, tamper-resistant die coatings, and tamper-resistant wafer coatings. Other ways to maintain physical security are also being developed. Two such examples are described in co-pending patent application Ser. No. 08/575,298 titled: SECURE SEMICONDUCTOR DEVICE, and Ser. No. 08/412,159 titled: METHOD TO PREVENT INTRUSIONS INTO ELECTRONIC CIRCUITRY, both assigned to the assignee of the instant application.

This physically secure environment 1 contains a processor 16 coupled by a bus 17 to a random access memory (RAM) 14. Bus 17 is electrically isolated from bus 7 by bus interface unit 19 which may be, for example, a bridge unit, and must be within the secure environment. As shown in FIG. 1, an optional flash memory 15 may be provided and coupled to bus 17. The flash memory is used for long-term storage of secret information, and a portion thereof may be allocated to applications running in the secure environment. Additionally, in one embodiment, the real time kernel for secure processor 16 is stored in the flash memory. This allows all basic operations to be performed without external intervention (active or passive), and improves performance as compared to moving the kernel through the security services described herein.

The secure environment is also provided with data security services. In that connection, an integrity check engine 13 performs a one-way hash of data paging between the secure environment 1 and the insecure environment 2. This provides an integrity service as explained below. If the data is paging out of the secure environment 1, the one-way hash value from the integrity check engine 13 or some portion thereof is stored within the secure environment as an integrity check value (ICV) for later comparison when that page of data is subsequently paged back in. An encryption/decryption engine 12 encrypts outgoing pages and decrypts incoming pages at the interface before sending them to the external storage 4 or integrity check engine 13, respectively, thereby providing a confidentiality service. A random number generator 18 is coupled to bus 17 to generate keying material for the encryption engine 12. An incoming page is decrypted by encryption engine 12 and passed to the integrity check engine 13 which calculates a one-way hash value of the incoming page. From the hash value, an ICV is derived and compared with previously stored ICV corresponding to that page. If the ICVs match, the page is allowed to populate secure RAM 14.

Because paging in and paging out generally involve latency and the security services increase the latency in the event of a page fault, it is desirable that the encryption engine 12 and integrity check engine 13 be implemented as dedicated hardware. But, it is within the scope and contemplation of the invention that either or both engines may be implemented as software. Additionally, for performance reasons, it is preferable that the encryption engine implement symmetric encryption. Keys for symmetric encryption tend to be much shorter for the same level of security than are keys for asymmetric encryption (e.g., a typical symmetric key is on the order of 56 bits to 128 bits while asymmetric keys tends to be more than 512 bits). This is particularly important in a severely memory constrained environment in which storage space for the keys is limited. Symmetric encryption is also typically orders of magnitude faster than asymmetric encryption. Two such symmetric encryption schemes are IDEA and DES. Other cryptographically strong encryption algorithms could equally be used without departing from the scope and contemplation of the invention. One-way hash functions are generally well-known in the art Two acceptable such hash functions are SHA-1 and MD5, but other hash functions could also be used without departing from the scope and contemplation of the invention.

Figure 2:
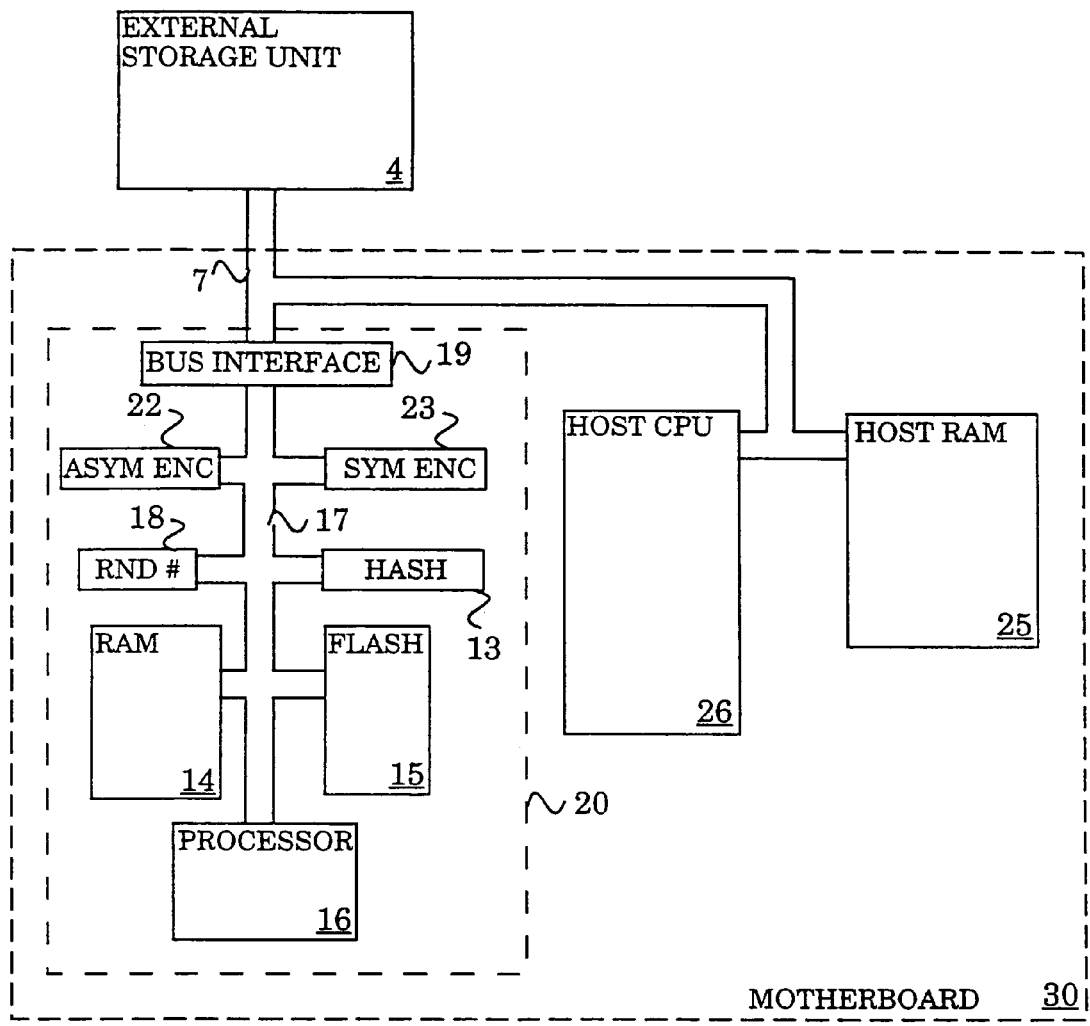
FIG. 2 is a block diagram of an alternate embodiment of the invention.

FIG. 2 shows an alternative embodiment of the invention having additional services within the secure environment 20. In this embodiment, the secure environment 20 is implemented as a single chip using physical security technology as is known in the art. This physically secure chip resides on the motherboard 30 and shares bus 7 with a host processor 26 and a host RAM 25. Bus interface unit 19 electrically isolates the secure environment bus 17 from the system bus 7. Both processor 16 and host processor 26 page out page frames to external storage unit 4 which may be, e.g., a personal computer hard disk. In one embodiment, secure processor 16 pages in 1K increments, while host processor 26 pages in 4K increments. Because the secure RAM 14 is small (e.g., 128K), it is desirable to employ a smaller page size than is typically employed when memory exhaustion is not as great a problem. To that end, a 1K page size has been found desirable in the secure environment 20. Accordingly, processor 16 is architected to use a 1K page. Host processor 26 treats the pages of processor 16 stored in external memory 4 as 1K data blocks.

The secure environment 20 contains both an asymmetric encryption engine 22 and a symmetric encryption engine 23, coupled to bus 17. As mentioned above, bus interface unit 19 resides within the secure environment and electrically isolates bus 17 from system bus 7 which extends into the unsecure environment. Symmetric engine 23 continues to be the preferred provider of the confidentiality service. The asymmetric engine 22 is used during installation to verify digital signatures and generally make the secure environment more robust. Installation is discussed below. It is important to realize that the secure environment 1 of FIG. 1 and 20 of FIG. 2 are interchangeable between the embodiments.

In one embodiment, the encryption engine performs encryption eight bytes at a time, and the integrity check engine hashes 512 bytes at a time. In such an embodiment, FIFOs or some other conventional buffering is provided as part of the encryption engine to ensure correct data flow. Determination of the amount and type of buffering required is within the ability of one of ordinary skill in the art given the data flow rates of the respective engines.

Figure 3:
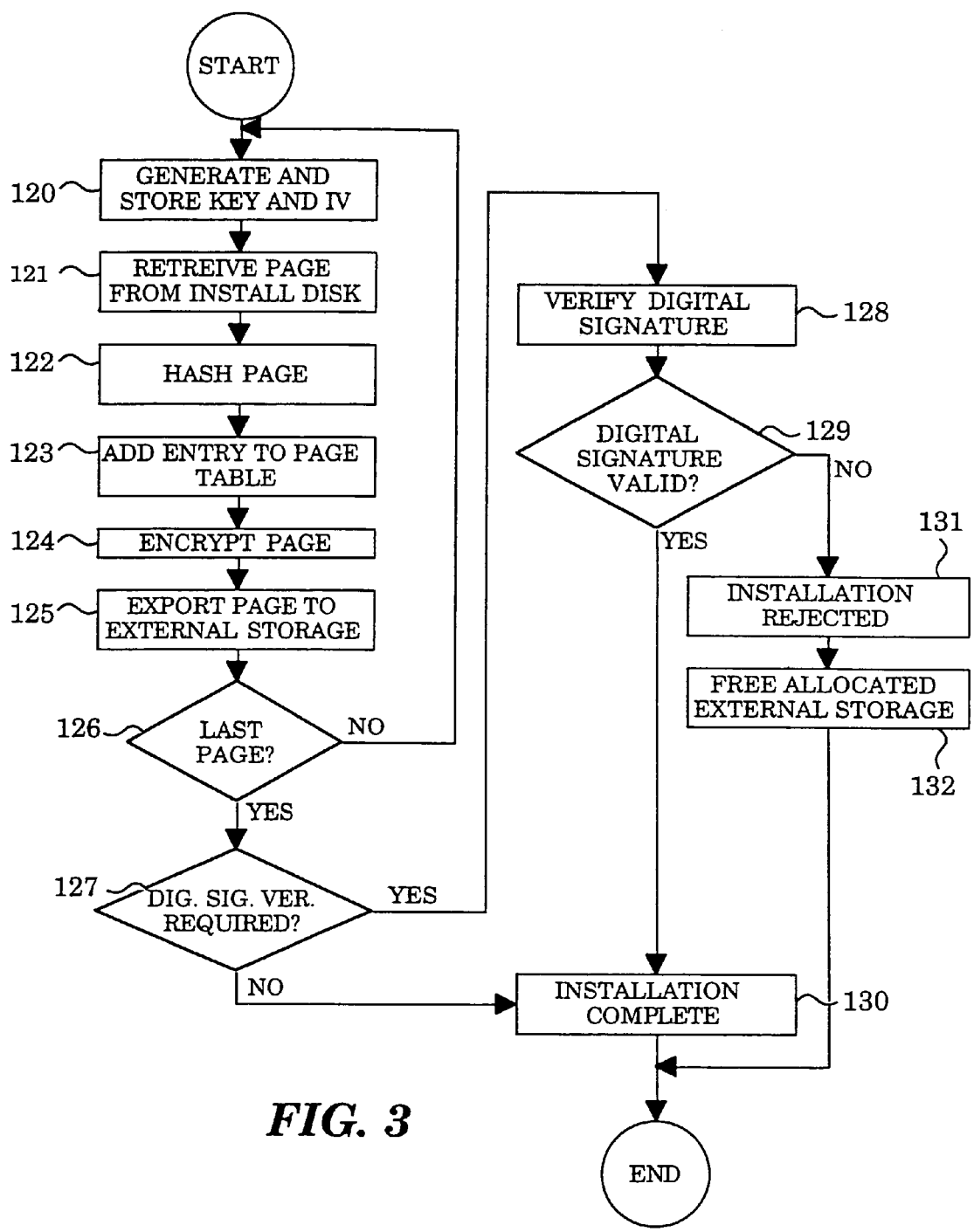
FIG. 3 is a flowchart of a software installation in one embodiment of the invention.

At some time, software must be installed in the secure environment Such "off the shelf" software will, of course, not be encrypted in the manner used within the secure environment It will typically have a digital signature which can be used to verify the authenticity of the software being installed if digital signature verification is a supported function within the secure environment. FIG. 3 shows a flowchart of installation of a program in the secure system. At functional block 120, a key is generated and initialization vector is generated for an application to be installed. Key generation can be accomplished using the random number generator which generates random bits. Random bits are collected until the desired key length is reached. In one embodiment, the random number generator has a thirty-two bit output register. The processor 16 reads the register a number of times necessary to collect enough random bits for a full key. Keys can be generated with one key for each application, i.e. all code pages and data pages associated with one application share the same key. One concern with shared keys between pages is that if, for example, two data pages have identical content, they would generally encrypt to the same encrypted value. However, in addition to the key, an initialization vector (IV) effects the encryption result: IVs are commonly used to provide cryptographic synchronization. Modifying this IV like modifying the key will change the resulting encrypted value. Because this system is effectively sending messages to itself, it can have a secret IV for the encryption engine. With a secret IV and using, for example, the page number as an offset, different encrypted data is assured for each page. Alternatively, a separate key could be generated for each page. This will increase the memory required to be devoted to key storage, but may improve the security of the data as the strength of the encryption resides in the key and the smaller the sample of data encrypted under one key, the tougher the data is to cryptanalyze.

At functional block 121, a page of information is retrieved from the installation disk. Bus 7 of FIG. 1 or FIG. 2 would be coupled to, e.g., a disk drive (not shown) containing such installation disk or other sources such as the Internet. At functional block 122, the incoming page would be hashed and an ICV generated therefrom and stored. The system needs to generate a hash value for each page as well as an overall hash value for the software being installed. After the page is hashed and the resulting ICV generated, at functional block 123, an entry is added to a page table. A page table entry will contain a page location identifier to allow the page to be located in external storage and may also contain a software pointer to the ICV corresponding to that page. This is discussed below in connection with FIG. 4b. This presumes a previously created page table. Creation of page tables is generally well known in the art. Two options for allocating page frames to a page table are discussed below.

Once a key is generated and provided to the encryption engine, the engine encrypts the previously hashed page at function block 124. The page that is encrypted in functional block 124 is exported to the external storage unit 4 at functional block 125. In this way, the page being installed does not reside in the secure RAM 14 until paged in after installation is complete. At decision block 126, it is determined whether the last page has been retrieved from the install disk or other source. If not, the installation continues by returning to retrieve another page at functional block 120. If it has retrieved the last page, decision block 127 represents an implicit decision depending on whether the system requires verification of digital signatures. If it does require such verification, at functional block 128, the digital signature is decrypted using the asymmetric engine with the resulting overall hash value generated by the originator of the software being extracted and compared to the overall hash value just calculated to verify that a valid digital signature exists for the installed software. A digital signature is typically a one-way hash of the entire code on the installation disk encrypted using the private part of an asymmetric key. For verification purposes, the asymmetric engine allows this signature to be decrypted using the public part of an asymmetric key. In decision block 129, if the signature is authentic, the installation is deemed complete at functional block 132. If the signature is not authentic, at functional block 131, the installation is rejected, and at functional block 132, the allocated external storage space is freed for other use. A system or user may choose, as a policy matter, not to require all software to have a signature for installation. Thus, in such a system, attempts to install software would be presumed valid, and installation is deemed complete at functional block 130, following decision block 127.

One embodiment of the invention employs a paging hierarchy in which the page directory always resides in the secure RAM 14 and a page table is associated with each application. The page table could be paged out when the application is not in use. For example, upon verification of the digital signature, the page table could itself be paged out just like any other page. The paging out process is discussed further in connection with FIG. 5 below.

In an alternate embodiment, both the page directory and the page tables (for the entire virtual memory size) are retained in the secure RAM. Thus, on installation, the pages are mapped into those page tables (e.g., more than one application may share one page table) before being exported to external storage. This reduces latency at start up of an application because only the needed page frames must traverse the security services, whereas in the other embodiment, first the page table must be paged in before the needed page frame can be identified and paged in. However, memory constraints may preclude this embodiment. It is also within the scope and contemplation of the invention to have multiple applications share a single page table which can be paged out. However, this complicates assignment of encryption keys (unless each page is assigned a key rather than each application) and may require retrieval of such page table from external memory at the time of installation of the second and any subsequent applications sharing the page table.

Figure 4A:
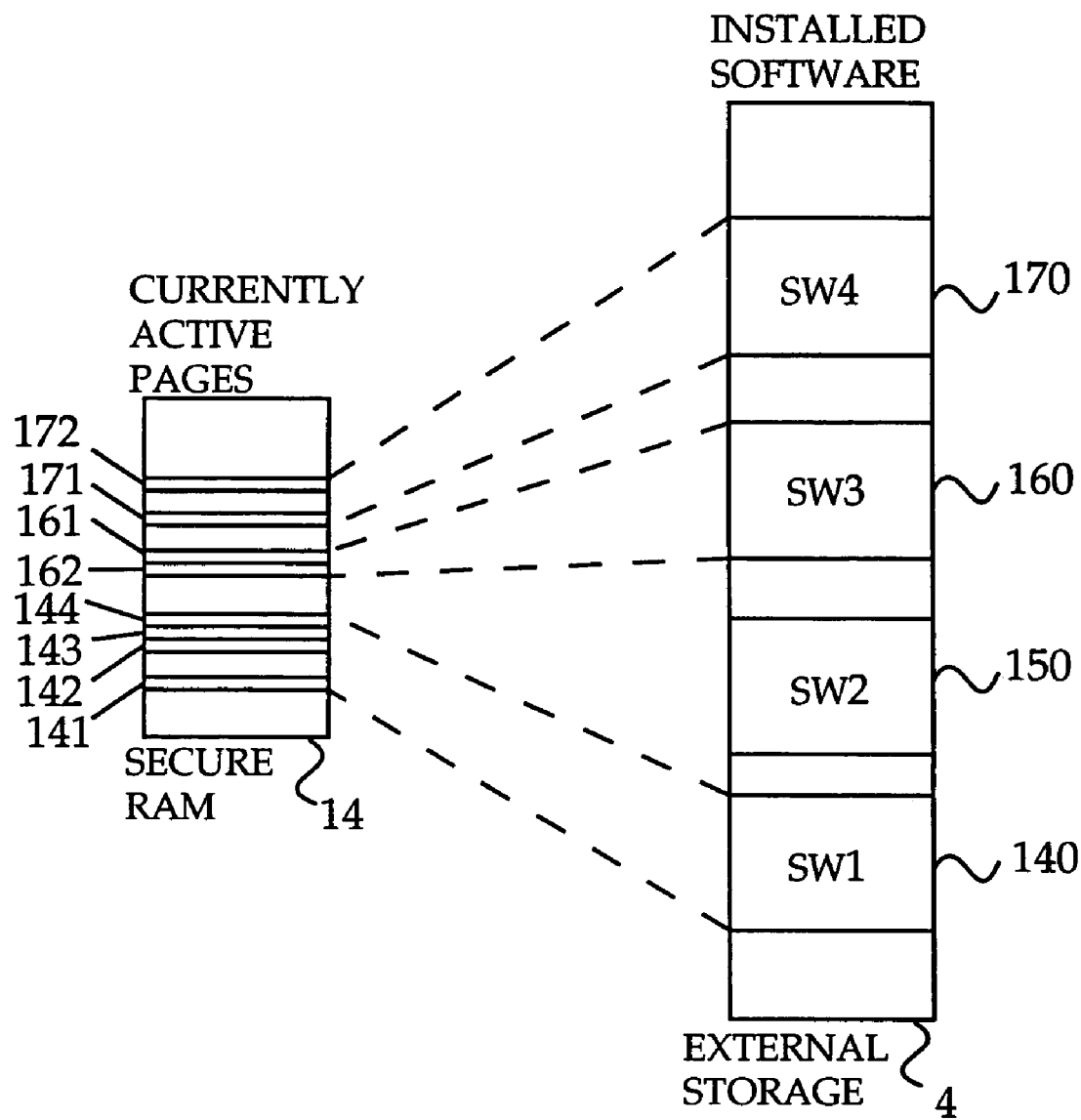
FIG. 4a is a diagram of software installed for use in the secure environment of one embodiment of the invention.

FIG. 4a shows one example in which four pieces of software 140, 150, 160, 170 (software is envisioned to include both code and data pages) have been installed through the secure environment and stored in the external storage unit 4 which may be a PC host hard disk. Three of the four pieces of software 140, 160, 170 have active pages in the physically secure memory. In one embodiment, the active pages will represent a page table and one or more page frames for each piece of software. For example, software 140 has page table 141 and page frames 142–144 residing in secure memory. Similarly, software 160 and 170 have page tables 161, 171 and page frames 162, 172, respectively, active in the secure RAM. Conversely, software 150 has its page table and all its page frames paged out to the external storage unit 4.

Figure 4B:
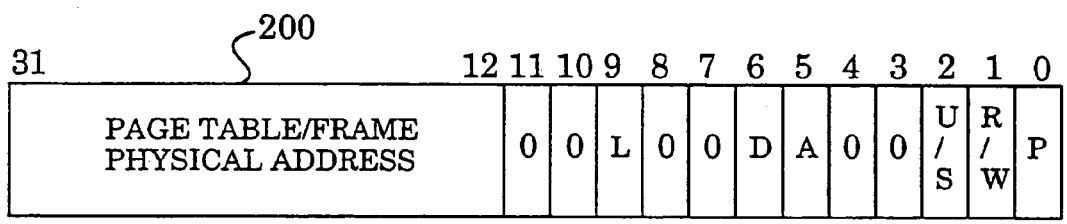
FIG. 4b is a diagram of page directory/page table entry of one embodiment of the invention.
Figure 4B:
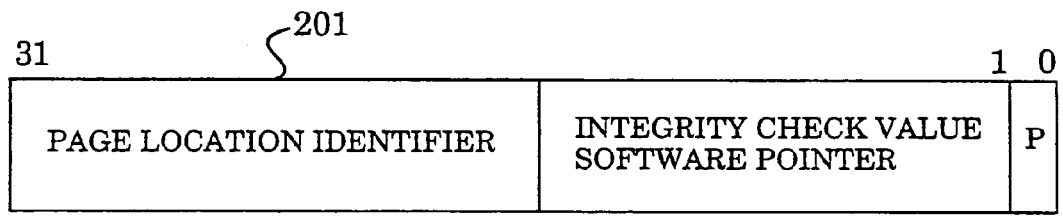

FIG. 4b shows a format of page directory and page table entry where the page table or page frame corresponding to the entry is present 200 or not present 201, respectively. The page directory entry corresponding to software 150 in FIG. 4a would have the not present form 201 assuming page tables are paged out rather than retained in memory. In any event, all the page table entries of software 150 would have the not present form 201. Thus, while the bit indicating the page is not present is retained, the remaining 31 bits can be arbitrarily divided between a page location identifier and a software pointer to an integrity check value. Various implementations of page location identifiers are well-known in the art as locating pages that have been paged out is required even in an insecure system. Possible implementations include the portion of the address or some indexing to a table of addresses. The fewer bits used as the page location identifier, the more bits are available for the software pointer to the ICV. Thus, in a memory constrained system, there is a trade-off between allotment of bits between these functions.

Other implementations are possible in which less than the whole hash value is used as the ICV. However, such implementations reduce the security provided by the integrity check service. In one such example, the hash value is truncated to produce an ICV which will fill in the page table entry with the page location identifier. While this may help solve memory exhaustion problems by not requiring separate secure memory pages be allocated to ICV storage, it is not recommended where any serious threat to integrity is believed to exist.

Figure 5A:
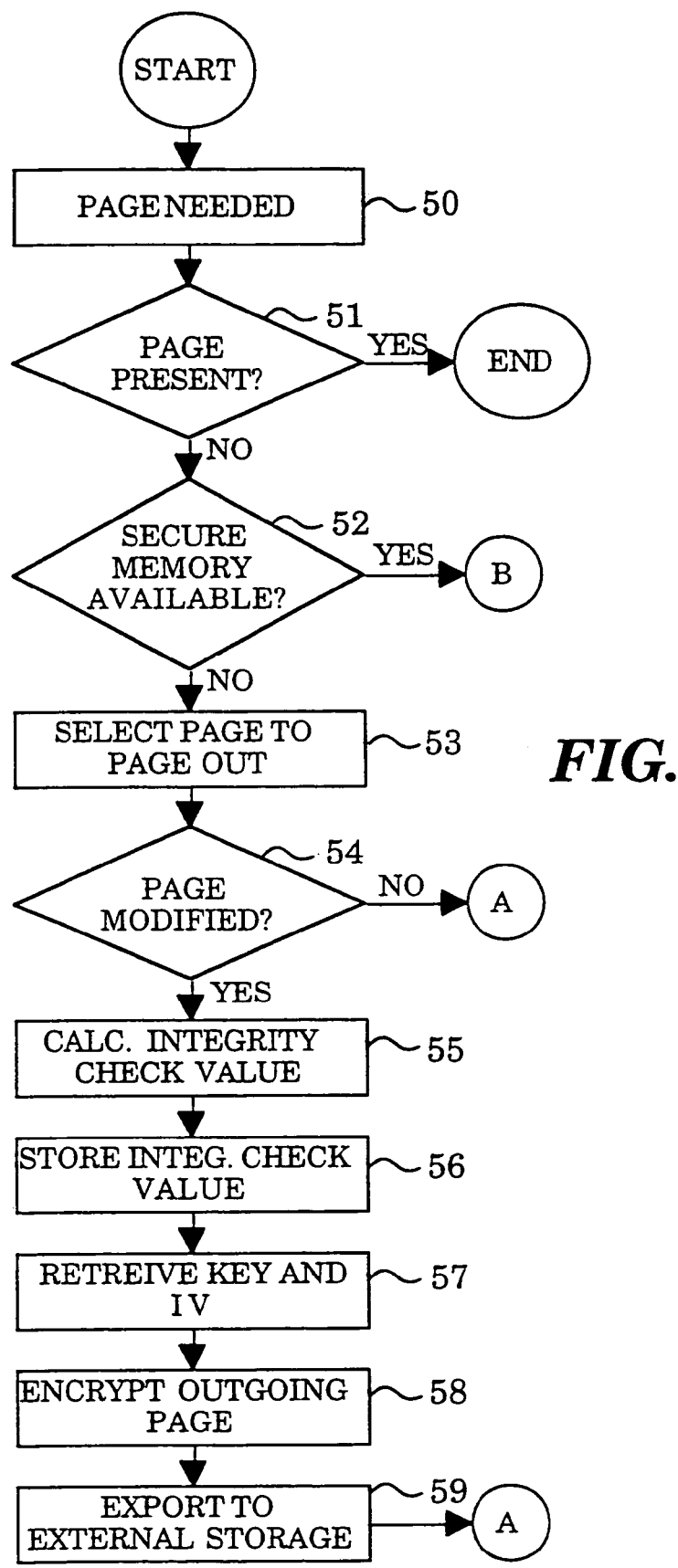
FIGS. 5a and b is a flowchart of a paging operation in one embodiment of the invention after installation is complete.
Figure 5B:
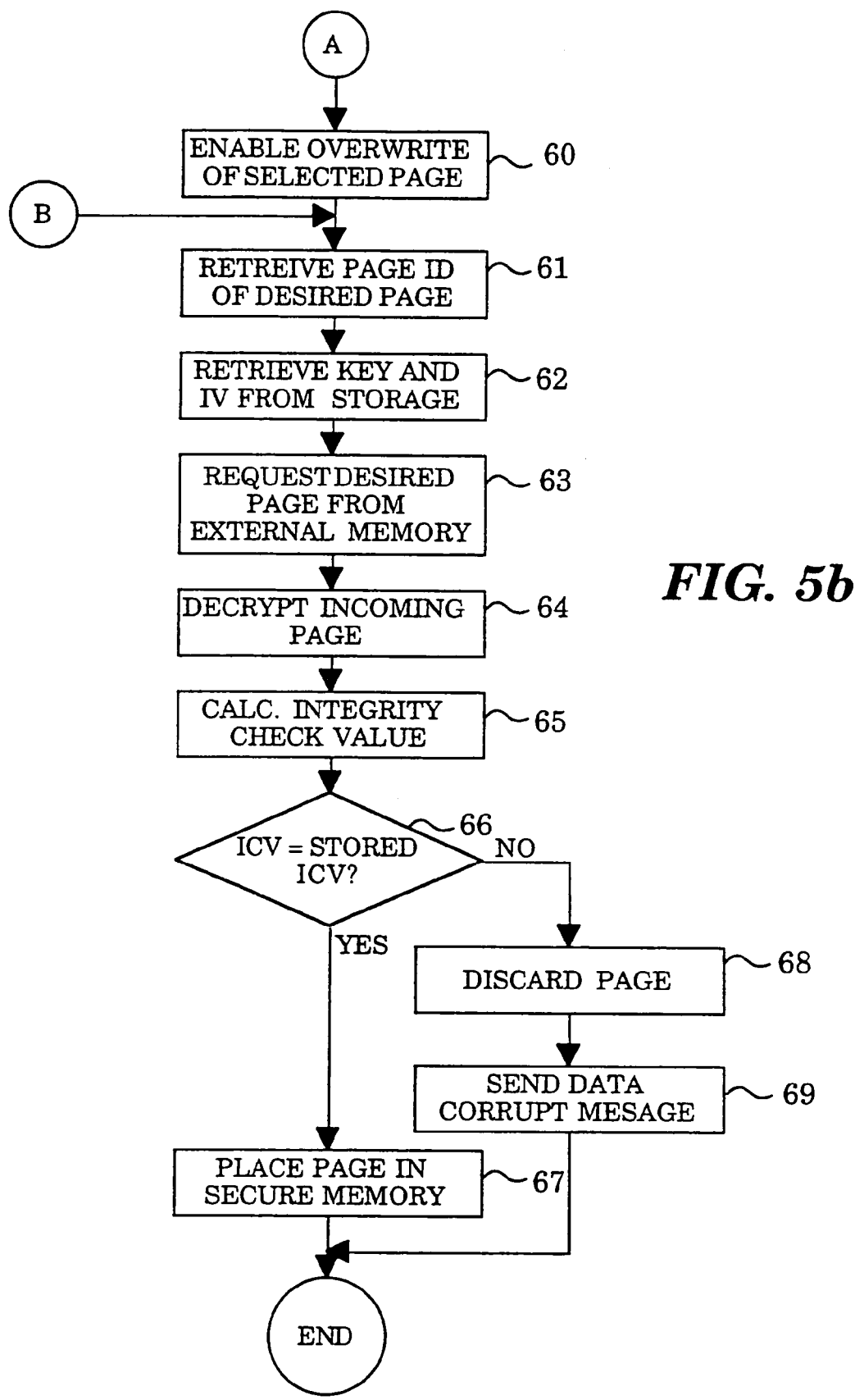

FIGS. 5a and b show a flowchart of one embodiment of the paging operation in a secure environment after installation. At functional block 50, a page is identified as needed. At decision block 51, a determination is made if the page is present within the secure memory. If the page is present, a page hit occurs and no further action is required. If the page is not present, a page fault occurs. When a page fault occurs, a determination is made, at decision block 52, if there is space available in the secure memory to which the needed page can be mapped. If no space is available, then a page is selected to page out at functional block 53. Various selection criteria may be employed such as least recently used (LRU). Other selection criteria are also well-known in the art. At decision block 54, a determination is made as to whether the outgoing page has been modified. If it has, at functional block 55, an integrity check value is calculated for the outgoing page. Typically, this will involve calculating the one-way hash value of the outgoing page and using the hash value as the ICV (less than the whole hash value may be used, but such reduces the reliability of the integrity service). At functional block 56, the integrity check value is stored in a predetermined location. This location can take the form of a data structure separately established to hold hash values with a pointer into that data structure stored in the page table or page directory entry corresponding to the outgoing page. The date structure may reside in the secure RAM and may be subject to paging out as discussed below.

At functional block 57, an encryption key and an IV are retrieved. As discussed above, the encryption key and IV are generated at the time of installation. At functional block 58, the outgoing page is encrypted using the key retrieved in functional block 57 and an initialization vector that may be offset by some value to ensure unique encryption. At functional block 59, the encrypted page is exported to the external storage.

If at decision block 54 the outgoing page has not been modified, or after the export of the outgoing page is complete at functional block 59, the system is enabled to overwrite the portion of secure memory occupied by the outgoing page. If at decision block 52 the secure memory has space or after the overwrite is enabled, the page location identifier of the desired page is retrieved through the corresponding entry in the page directory or page table at functional block 61. The key and IV corresponding to the needed page is retrieved from key and IV storage at functional block 62. Keys and IV may, but need not, be stored in the same data structure. A request for that page is then sent to the external storage unit at functional block 63. The key and IV are used to decrypt the incoming page at functional block 64. The decrypted page is hashed and an ICV determined at functional block 65. The ICV of the incoming page is compared with the previously stored ICV at decision block 66. If the ICV of the incoming page is equal to the ICV stored corresponding to that page when it was previously exported, either during installation or after previous use, the page is placed in secure memory, and execution or operation on that page may be performed by the processor at functional block 67. If the ICVs do not match, the page is discarded at functional block 68, and a data corrupt message is sent to the secure processor at functional block 69.

In one embodiment, particularly if secure RAM space is severely constrained, additional levels of indirection may be used to handle memory exhaustion. For example, pages containing keying information could themselves be hashed, encrypted (with their own randomly generated key and IV) and exported to external memory. In this embodiment, latency at start-up is increased because the keying information must first be retrieved, decrypted, integrity checked and the desired key and IV identified before the page table and/or page frames may be paged in. The-advantage to this system is that storage of keying material does not become a critical limitation. It is desirable to generate a separate key and IV for such pages, e.g., do not use a key and IV associated with a particular application. Similarly, pages holding ICVs may be paged out. Thus, several levels of indirection may be employed at the cost of increased start-up latency.

In some embodiments, it may become desirable to update or change the keying material. The period during which one key is retained is the cryptoperiod. The cryptoperiod may be fixed or under user control. In either case, when an update is desired/occurs, the system performs similar to the install procedure. The page table must, if paged out, be brought into the secure RAM before its pages can be re-keyed. Rather than coming from the install disk to be claimed from the bus by the integrity check engine, each page frame is paged in from the external storage unit, decrypted and integrity checked in the normal way. Then the page frame is reencrypted with a new key and IV (either or both of which may be generated on an application or page by page basis) and exported back to external storage. It is unnecessary for the page frames to populate the secure RAM during this update.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   importing encrypted incoming information into a physically secure environment from an external storage unit of a physically insecure environment;
   decrypting the encrypted incoming information within the physically secure environment;
   calculating an integrity check value for the incoming information within the physically secure environment;
   comparing the integrity check value of the incoming information with a previously stored
   integrity check value corresponding to the incoming information from within the physically secure environment;
   discarding the incoming information when the calculated integrity check value does not match the previously stored integrity check value of the incoming information;
   storing the incoming information within the physically secure environment when the calculated integrity check value matches the previously stored integrity check value of the incoming information; and
   processing the stored, incoming information within the physically secure environment.

2. The method of claim 1, wherein prior to importing incoming encrypted information, the method further comprising:
   generating an integrity check value for outgoing information within the physically secure environment;
   storing the integrity check value for the outgoing information within the physically secure environment;
   encrypting the outgoing information within the physically secure environment; and
   exporting the encrypted outgoing information outside the physically secure environment to an external storage unit within an insecure environment.

3. The method of claim 2 wherein the encrypted outgoing information is encrypted using a symmetric encryption algorithm.

4. The method of claim 2 wherein the generating of the integrity check value comprises:
   one way hashing the outgoing information; and
   storing a predetermined portion of a hash value of the outgoing information in a location within the physically secure environment.

5. The method of claim 3 further comprising:
   retrieving a random key for use in encrypting the outgoing information.

6. The method of claim 5 wherein outgoing information related to a single application is encrypted using a same key.

7. The method of claim 5 wherein a different key is generated for encrypting each portion of outgoing information.

8. The method of claim 5 further comprising:
   storing the key in a table in the physically secure environment.

9. The method of claim 4 wherein the location is pointed to by a pointer in a field of a page table entry corresponding to the outgoing information.

10. The method of claim 4 wherein the predetermined portion is the whole hash value.

11. The method of claim 10 wherein outgoing information related to a single application is encrypted using a same key.

12. The method of claim 10 wherein a different key is generated for encrypting each portion of outgoing information.

13. The method of claim 10 further comprising:
    storing the key in a table in the physically secure environment.

14. The method of claim 9 wherein the predetermined portion is the whole hash value.

* * * * *